(12) United States Patent
Ogura

(10) Patent No.: US 12,271,501 B2
(45) Date of Patent: Apr. 8, 2025

(54) COMMUNICATION METHOD OF HANDLING OF A USER USING A TOKEN THAT PERMITS COLLECTIVE DISCLOSURE OF USER DATA

(71) Applicant: FUJITSU LIMITED, Kawasaki (JP)

(72) Inventor: Takao Ogura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 627 days.

(21) Appl. No.: 17/381,710

(22) Filed: Jul. 21, 2021

(65) Prior Publication Data

US 2022/0108036 A1   Apr. 7, 2022

(30) Foreign Application Priority Data

Oct. 5, 2020   (JP) .................................. 2020-168516

(51) Int. Cl.
  *G06F 21/62*  (2013.01)
  *H04L 9/40*  (2022.01)
(52) U.S. Cl.
  CPC ...... *G06F 21/6245* (2013.01); *H04L 63/0853* (2013.01)
(58) Field of Classification Search
  CPC ............ G06F 21/6245; H04L 63/0853; H04L 63/0807
  USPC .......................................................... 726/9
  See application file for complete search history.

(56) References Cited

U.S. PATENT DOCUMENTS

| | | | |
|---|---|---|---|
| 2020/0034563 A1* | 1/2020 | Stockert | G16H 10/60 |
| 2020/0042727 A1 | 2/2020 | Ogura et al. | |
| 2020/0092385 A1 | 3/2020 | Ogura et al. | |
| 2020/0302088 A1* | 9/2020 | Lee | H04L 9/3263 |
| 2020/0304542 A1* | 9/2020 | Ilincic | H04M 3/5175 |

FOREIGN PATENT DOCUMENTS

| | | |
|---|---|---|
| JP | 2015-201098 | 11/2015 |
| JP | 2020-24511 | 2/2020 |
| JP | 2020-46959 | 3/2020 |

OTHER PUBLICATIONS

Office Action dated Feb. 8, 2024 in Japanese Patent Application No. 2020-168516.

NRI Secure Technologies, Ltd., "Standards Developed by the OpenID Foundation Details", Certification Authorization Studies, Sep. 25, 2020; 82 pages.

* cited by examiner

*Primary Examiner* — Catherine Thiaw
*Assistant Examiner* — Nega Woldemariam
(74) *Attorney, Agent, or Firm* — STAAS & HALSEY LLP

(57) ABSTRACT

A procedure includes transmitting request information concerning user data requested to be collectively acquired, to an agreement server, requesting a token by scheduling a transmission timing of a token request for requesting to issue the token associated with a plurality of users from whom the agreement has been obtained among the users who fall under the request information, and by transmitting the token request to the agreement server in accordance with the scheduling, and acquiring, from a data management server, the user data not acquired yet in the user data on the users from whom the agreement has been obtained, by using the token acquired in the requesting the token.

12 Claims, 16 Drawing Sheets

FIG. 14A

| USER | CD | AGREEMENT STATE | DATE AND TIME OF OBTAINING |
|---|---|---|---|
| 400-1 | CD1 | OK | 202003201210 |
| 400-2 | CD1 | OK | 202003201315 |
| 400-3 | CD1 | OK | 202003211841 |
| 400-4 | CD1 | RESPONSE WAITING | – |
| ⋮ | ⋮ | ⋮ | ⋮ |
| 400-n | CD1 | NO | 202003201810 |
| ⋮ | ⋮ | ⋮ | ⋮ |

FIG. 14B

| CD | RP | REQUEST | TOKEN | GENERATION TIME | USER LIST | DIFFERENCE LIST |
|---|---|---|---|---|---|---|
| CD1 | RP1 | REq 5234 | TOKEN T1 | 202003202350 | 400-1, 400-2 | – |
| CD1 | RP1 | REq 5234 | TOKEN T2 | 202003212350 | 400-1, 400-2, 400-3 | 400-3 |
| ⋮ | ⋮ | ⋮ | ⋮ | ⋮ | ⋮ | ⋮ |

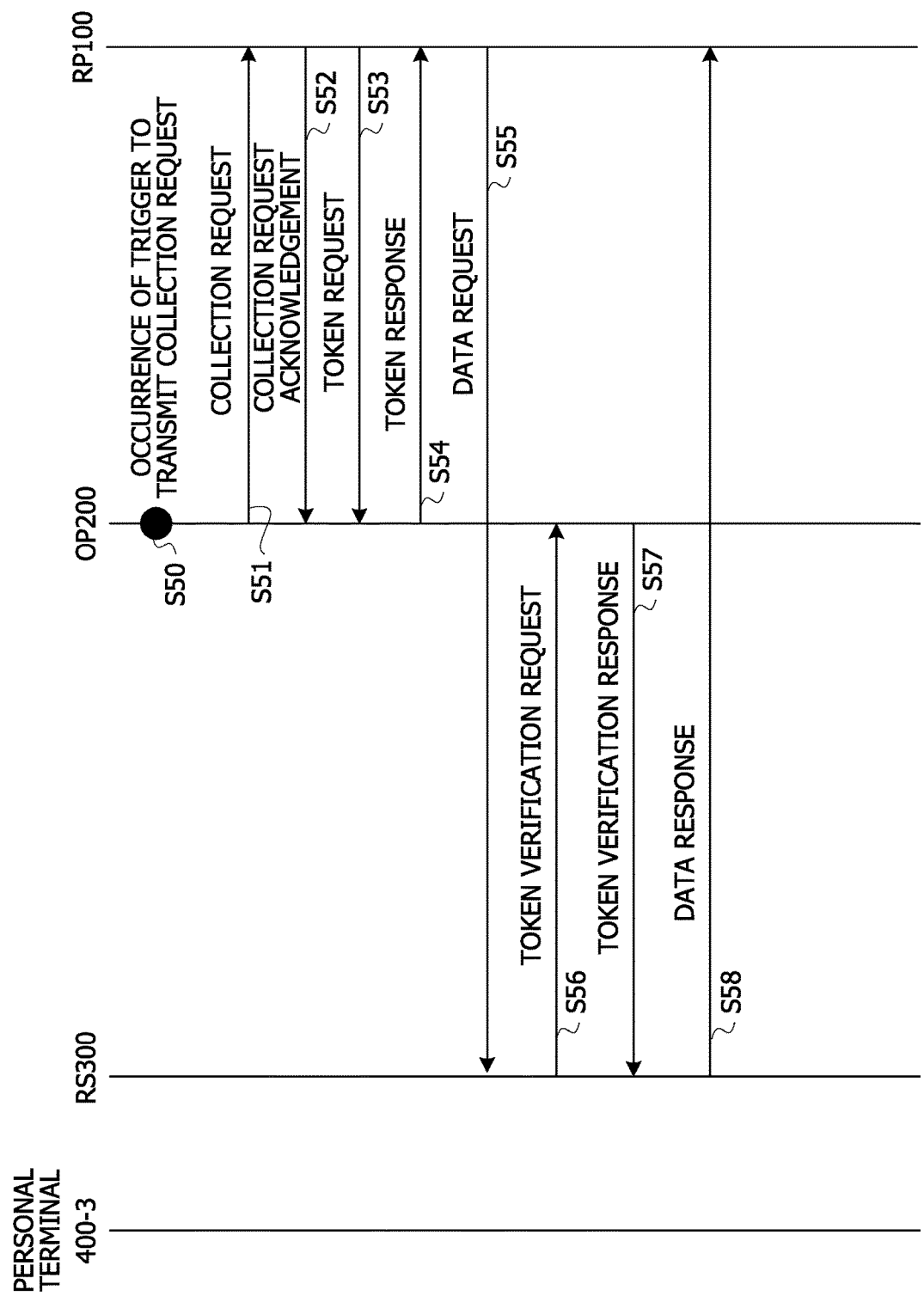

COMMUNICATION METHOD OF HANDLING OF A USER USING A TOKEN THAT PERMITS COLLECTIVE DISCLOSURE OF USER DATA

CROSS-REFERENCE TO RELATED APPLICATION

This application is based upon and claims the benefit of priority of the prior Japanese Patent Application No. 2020-168516, filed on Oct. 5, 2020, the entire contents of which are incorporated herein by reference.

FIELD

The embodiments discussed herein are related to a communication method for a service of handling personal information.

BACKGROUND

In recent years, services for depositing (or registering) personal information, such as a personal data store (PDS) and an information bank, have been released and been attracting attention. A service of handling personal information has to obtain an agreement of a user when providing data registered by the user to a third party. In the service of handling personal information, for example, a user registers personal information such as results of health examinations conducted in a hospital or the like and a purchase history of the user in a PDS or an information bank. When providing the personal information on a user to a third party, the PDS or information bank obtains an agreement of the user himself or herself.

Such a system that implements a service of handling personal information may use, for example, Client Initiated Backchannel Authentication (CIBA) protocol.

Techniques related to a service of handling personal information are described in the following documents.

Japanese Laid-open Patent Publication Nos. 2020-046959 and 2015-201098 are disclosed as related art.

SUMMARY

According to an aspect of the embodiments, a non-transitory computer-readable recording medium storing a program that causes a computer to execute a procedure, the procedure includes transmitting request information concerning user data requested to be collectively acquired, to an agreement server that requests a plurality of users to approve an agreement to disclose the user data to a data utilization server that acquires the user data from a data management server that manages the user data on the users, by using a token that is issued by the agreement server and that permits disclosure of the user data on the users from whom the agreement has been obtained, wherein the procedure being executed by the data utilization server, requesting the token by scheduling a transmission timing of a token request for requesting to issue the token associated with the users from whom the agreement has been obtained among the users who fall under the request information, and by transmitting the token request to the agreement server in accordance with the scheduling, and acquiring, from the data management server, the user data not acquired yet in the user data on the users from whom the agreement has been obtained, by using the token acquired in the requesting the token.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 14A and 14B are diagrams illustrating examples of internal tables included in the OP;

FIG. 16 is a diagram illustrating an example of a sequence of a data acquisition process in response to a collection request.

DESCRIPTION OF EMBODIMENTS

The CIBA protocol does not take into consideration a use case of requesting an agreement from multiple users. For example, a medical researcher may request multiple virus-infected persons to provide medical data. In this case, the medical researcher or a service provider who works on behalf of the medical researcher has to ask the multiple virus-infected persons to agree to provide the data. As the number of virus-infected persons increases, the workload increases. The medical researcher or the service provider who works on behalf of the medical researcher has to suspend data acquisition until all the virus-infected persons express their intentions of agreement or refusal, which may result in a delay of the data acquisition.

Hereinafter, embodiments of a technique that enables efficient acquisition of multiple pieces of data for which users' agreement is requested will be described with reference to the drawings.

First Embodiment

A first embodiment will be described.

Configuration Example of Communication System 1

Figure 1:
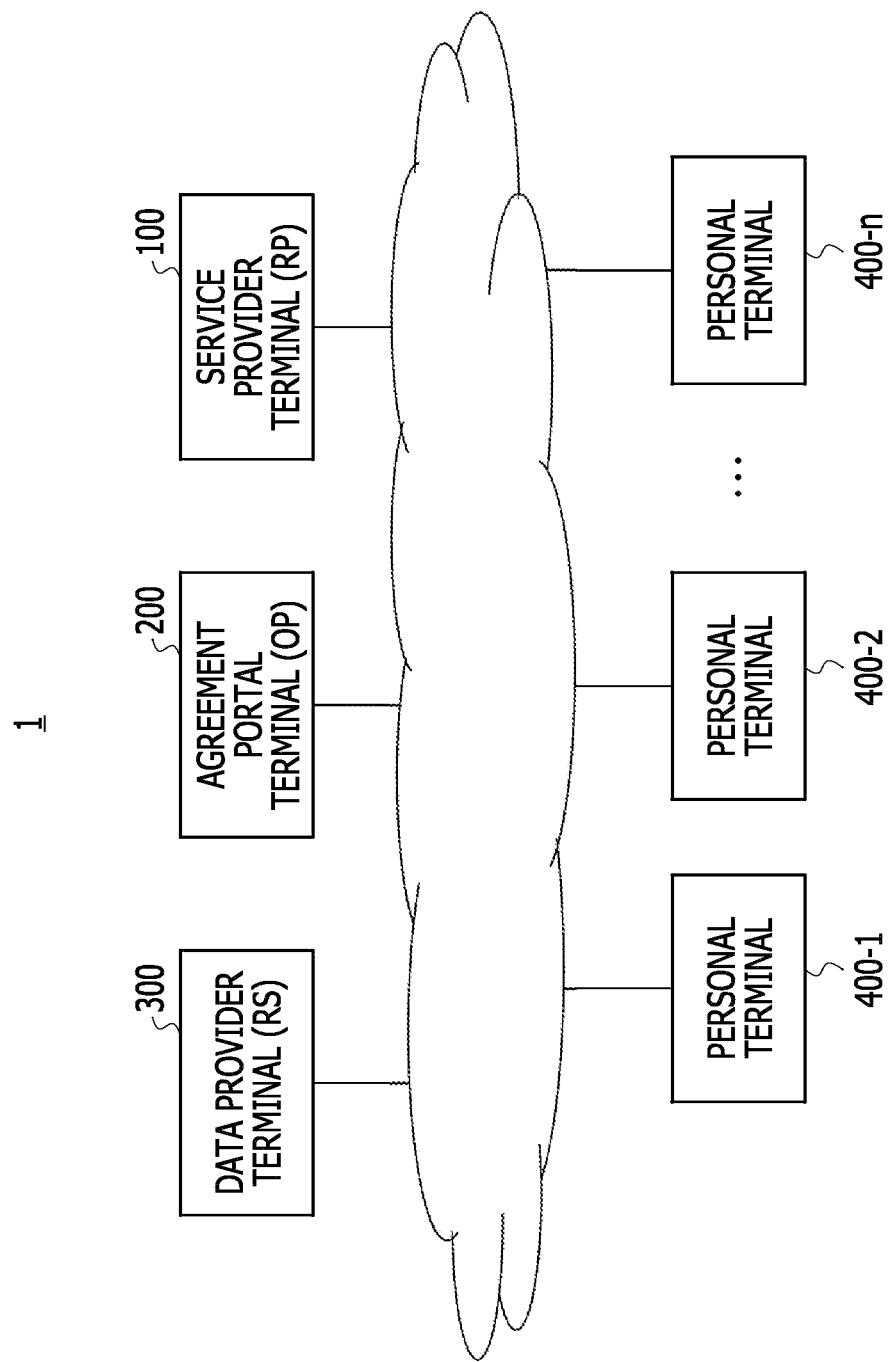
FIG. 1 is a diagram illustrating a configuration example of a communication system.

FIG. 1 is a diagram illustrating a configuration example of a communication system 1. The communication system 1 includes a service provider terminal 100 (hereinafter, also referred to as a relying party (RP) 100), an agreement portal terminal 200 (hereinafter, also referred to as an openID provider (OP) 200), a data provider terminal 300 (hereinafter, also referred to as a resource server (RS) 300), and personal terminals 400-1 to 400-n (hereinafter, also referred to as personal terminals 400). The communication system 1 is a system that provides the PR 100 with personal information on users (users of the personal terminals 400) managed by the RS 300 after obtaining an agreement of the users. The OP 200 performs an agreement process of obtaining the agreement of the users via the personal terminals 400. Each of the terminals performs communication via a network such as the Internet or a local network.

The communication system 1 supports collective data acquisition and individual data acquisition. The individual data is a piece of data on one person (or one group) individually designated. The collective data is multiple pieces of data on multiple users. The collective data is defined, for example, with specification of characteristics including a characteristic such as a medical history as in "medical examination data on users infected with a certain virus" and users' attribute-related characteristics such as sex, height, weight, address, and telephone number. The collective data may be defined with specification of an acquisition period as in "medical examination data on users infected with a certain virus in a period until August 30", for example.

The RP 100 is a data utilization server used by a service provider that provides data to a data user, who will use the data, in response to a request from the data user, and is, for example, a computer or a server machine. The RP 100 receives a request to acquire the collective data or the individual data from the data user, and requests the OP 200 to obtain an agreement of users in response to the request.

The OP 200 is an agreement server having an agreement portal site for requesting an agreement from the personal terminals 400 and is, for example, a computer or a server machine. For example, the OP 200 extracts the personal terminals 400 in accordance with data contents that the data user desires to acquire, and performs an agreement process of requesting an agreement from the extracted personal terminals 400.

The RS 300 is a data management server that manages the personal information on the users, and is, for example, a computer or a server machine. The RS 300 transmits the personal information (user data) on each of the users from whom the agreement has been obtained to the RP 100.

Each of the personal terminals 400 is a terminal device used by a user and is, for example, a computer or a tablet terminal. For example, when the agreement is requested, the personal terminal 400 displays, on its own display screen, a screen window for checking whether the user approves the agreement or not, and thereby prompts the user to perform an operation of expressing his/her intention of agreement or refusal.

Configuration Example of RP 100

Figure 2:
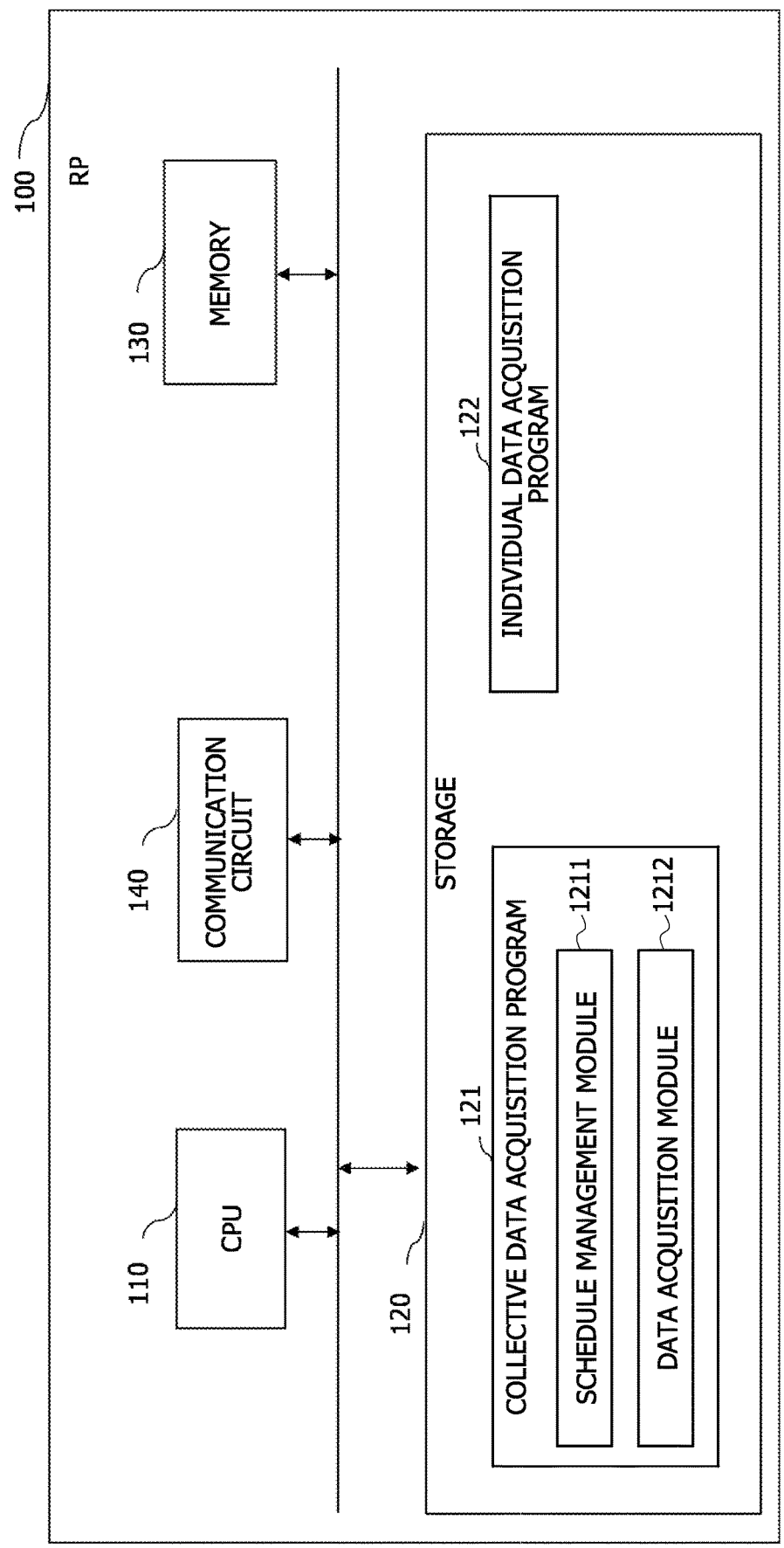
FIG. 2 is a diagram illustrating a configuration example of an RP.

FIG. 2 is a diagram illustrating a configuration example of the RP 100. The RP 100 is, for example, a server machine including a central processing unit (CPU) 110, a storage 120, a memory 130, and a communication circuit 140.

The storage 120 is an auxiliary storage device such as a flash memory, a hard disk drive (HDD), or a solid-state drive (SSD) that stores programs and data. The storage 120 stores a collective data acquisition program 121 and an individual data acquisition program 122.

The memory 130 is an area onto which the programs stored in the storage 120 are loaded. The memory 130 may also be used as an area into which data is stored by the programs.

The CPU 110 is a processor that loads any of the programs stored in the storage 120 onto the memory 130, and executes the loaded program to implement processes constructing the program.

The communication circuit 140 is a circuit that communicates with other devices. The communication circuit 140 transmits and receives data to and from the other devices via the network. The communication circuit 140 is, for example, a network interface card (NIC).

The CPU 110 performs a collective data acquisition process by executing the collective data acquisition program 121. The collective data acquisition process is a process of transmitting an agreement request including data contents to be acquired, such as contents and a period, in response to a collective data acquisition request transmitted from the data user. The RP 100 performs a schedule management process for a schedule of regularly acquiring the collective data in the collective data acquisition process.

The CPU 110 performs the schedule management process by executing a schedule management module 1211 included in the collective data acquisition program 121. The schedule management process is a process of managing a schedule (transmission timing) of requesting a token from the OP 200 (transmitting a token request) and waiting for a token response. The token is a data transmission permission associated with users from whom the agreement has been obtained and is issued by the OP 200.

The CPU 110 performs a data acquisition process by executing a data acquisition module 1212 included in the collective data acquisition program 121. The data acquisition process is a process of acquiring data from the RS 300. The RP 100 transmits the token to the RS 300 and receives the data in the data acquisition process.

The CPU 110 performs an individual data acquisition process by executing the individual data acquisition program 122. The individual data acquisition process is a process of acquiring data on a certain user by designating the user, for example.

Configuration Example of OP 200

Figure 3:
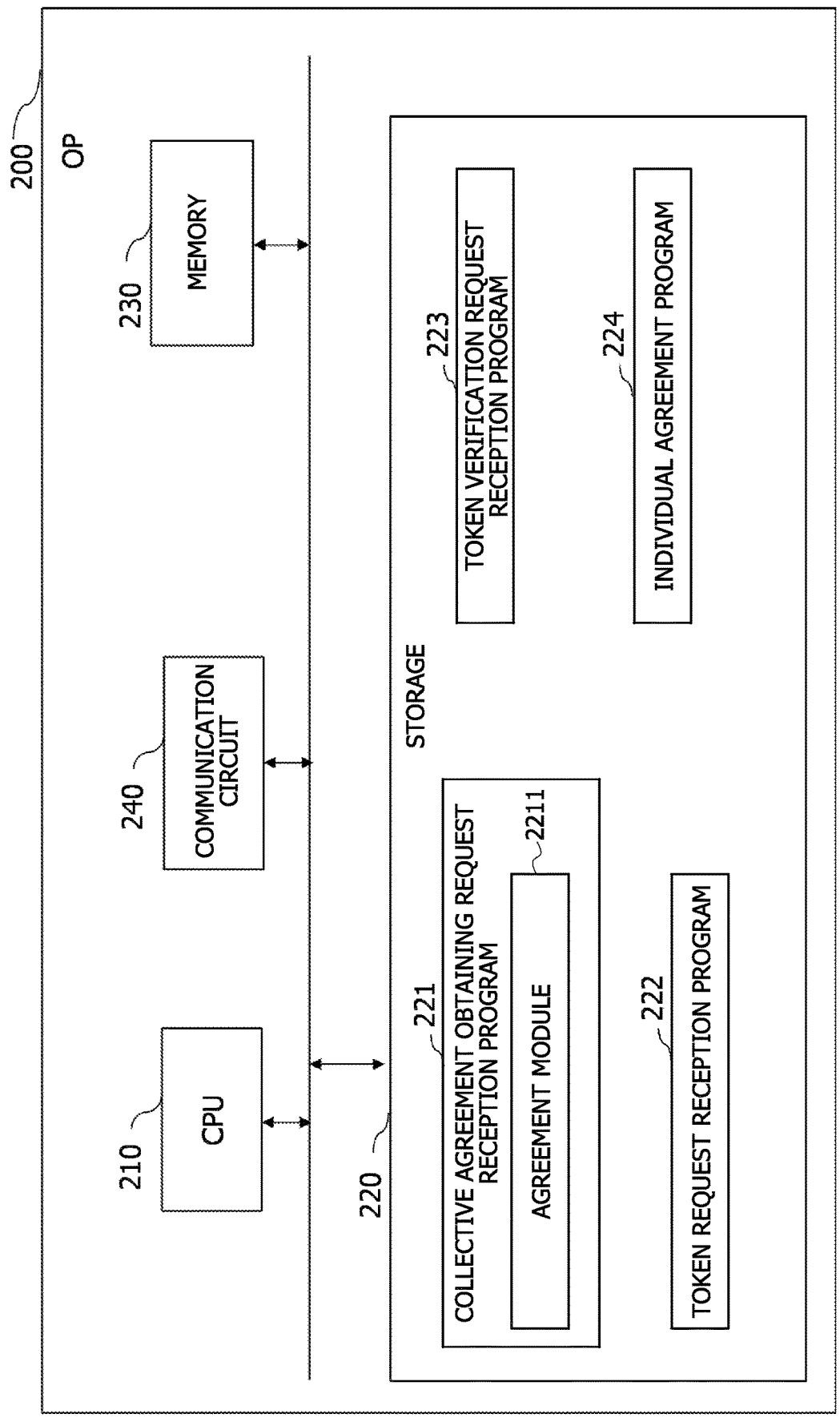
FIG. 3 is a diagram illustrating a configuration example of an OP.

FIG. 3 is a diagram illustrating a configuration example of the OP 200. The OP 200 is, for example, a server machine including a CPU 210, a storage 220, a memory 230, and a communication circuit 240.

The storage 220 is an auxiliary storage device, such as a flash memory, an HDD, or an SSD, for storing programs and data. The storage 220 stores a collective agreement obtaining request reception program 221, a token request reception program 222, a token verification request reception program 223, and an individual agreement program 224.

The memory 230 is an area onto which the programs stored in the storage 220 are loaded. The memory 230 may also be used as an area into which data is stored by the programs.

The CPU 210 is a processor that loads any of the programs stored in the storage 220 onto the memory 230, and executes the loaded program to implement processes constituting the program.

The communication circuit 240 is a circuit that communicates with other devices. The communication circuit 240 transmits and receives data to and from the other devices via the network. The communication circuit 240 is, for example, an NIC.

The CPU 210 performs a collective agreement obtaining request reception process by executing the collective agreement obtaining request reception program 221. The collective agreement obtaining request reception process is a process executed when a collective agreement obtaining request is received from the RP 100. In the collective agreement obtaining request reception process, the OP 200 extracts the concerned users and performs the agreement process to obtain the agreement from the concerned users.

The CPU 210 performs the agreement process by executing an agreement module 2211 included in the collective agreement obtaining request reception program 221. The agreement process is a process of requesting the user to express his/her intention of agreement or refusal and obtaining the intention of agreement or refusal from the user.

The CPU 210 performs a token request reception process by executing the token request reception program 222. The token request reception process is a process of receiving a token request from the RP 100. In the token request reception process, the OP 200 generates a token associated with the users from whom the agreement has been obtained and transmits the generated token to the RP 100.

The CPU 210 performs a token verification request reception process by executing the token verification request reception program 223. The token verification request reception process is a process of receiving a token verification request from the RS 300. In the token verification request reception process, the OP 200 checks the validity of the token, and, when the token is valid, transmits to the RS 300 a token verification response including a user list associated with the token and information that the token is valid.

The CPU 210 performs an individual agreement process by executing the individual agreement program 224. The individual agreement process is a process executed when the RP 100 requests an agreement of the individual user in an individual data acquisition. In the individual agreement process, the OP 200 executes a process of obtaining an agreement from the concerned user.

[Usage Data Acquisition Process]

Figure 4:
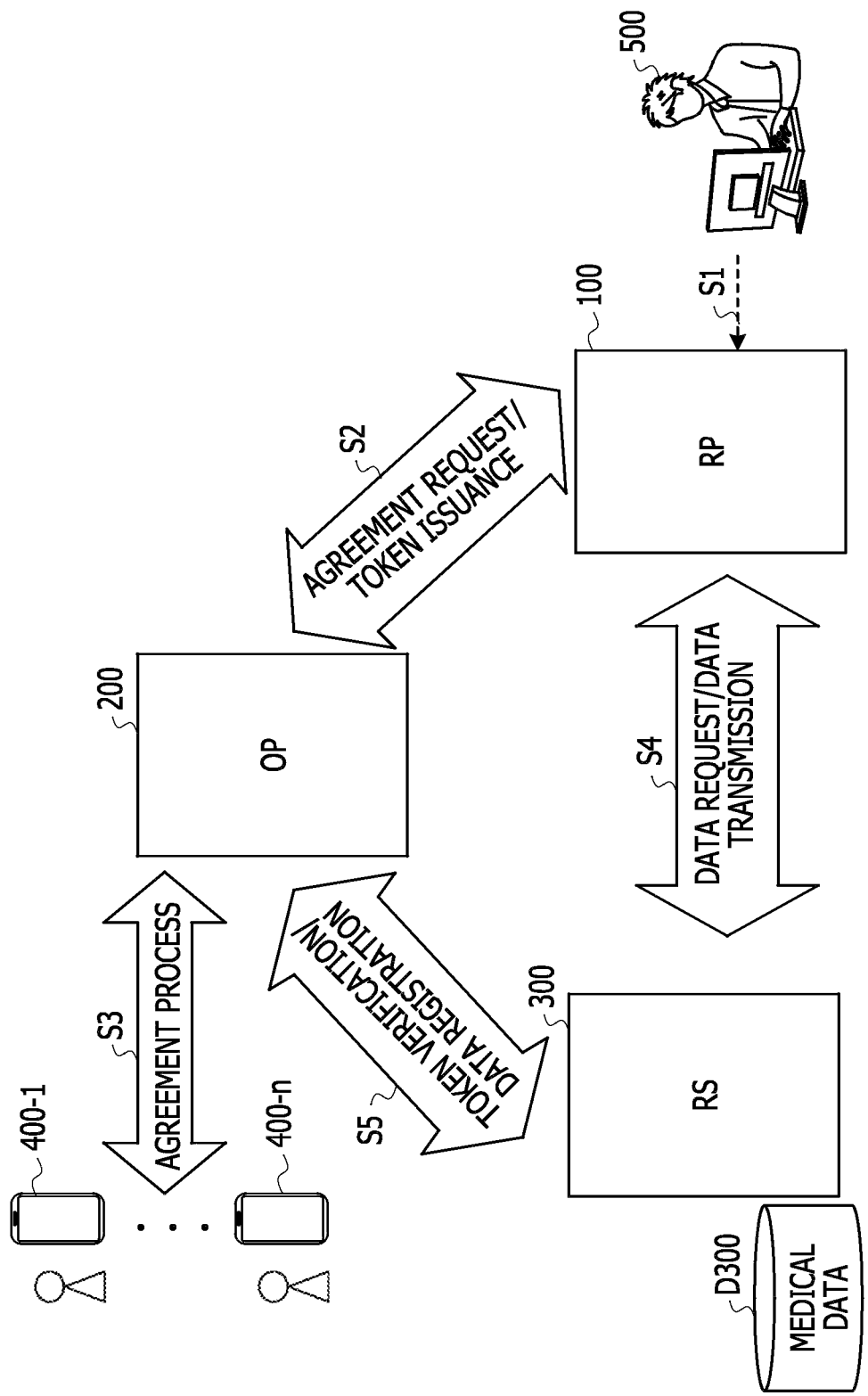
FIG. 4 is a diagram illustrating an example of a sequence in a usage data acquisition process.

The usage data acquisition process in the RP 100 includes a collective data acquisition and an individual data acquisition. An overview of the usage data acquisition process will be described. FIG. 4 is a diagram illustrating an example of a sequence of the usage data acquisition process.

A data user 500 notifies the RP 100 of a type and contents of data requested (S1). The type and contents of data requested include, for example, whether the type of data requested is collective data or individual data, what contents of data are desired to be acquired, a data acquisition period in the case of a collective data acquisition, and so on.

In response to the request from the data user, the RP 100 requests the OP 200 to obtain an agreement (S2). When the OP 200 is requested to obtain the agreement, the OP 200 performs the agreement process for the personal terminal 400 of the concerned user and obtains the agreement (S3).

When a trigger to request a token (for example, such as an elapse of a predetermined time) occurs, the RP 100 requests the OP 200 to issue the token (S2).

When the token is requested, the OP 200 generates the token associated with the users from whom the agreement has been obtained and transmits the token to the RP 100 (S2).

When the RP 100 acquires the token, the RP 100 transmits the token to the RS 300 and requests the data acquisition from the RS 300 (S4).

The RS 300 requests the OP 200 to verify the token in order to verify the validity of the token (S5).

The OP 200 determines the validity of the token, and transmits a user list of the users associated with the token to the RS 300 when the token is valid (S5).

When the token is valid, the RS 300 extracts the personal information on the users listed in the user list from medical data D300, and transmits the extracted data to the RP 100 (S4).

The RP 100 acquires the data and stores the acquired data in, for example, an internal memory. The data user 500 may acquire or copy the data stored in the RP 100 at any timing.

[Collective Data Acquisition Process]

Next, the collective data acquisition process will be described. The description will be given of an example case of the collective data acquisition process of collectively acquiring data specified as "medical examination data on virus-infected persons in a period until August 30". In the following example, a trigger for the RP 100 to transmit a token request is set to 23:59 every day until the designated date (August 30). Hereinafter, the collective data acquisition process will be described dividedly for the first day and then for the second or subsequent day.

[First Day]

Figure 5:
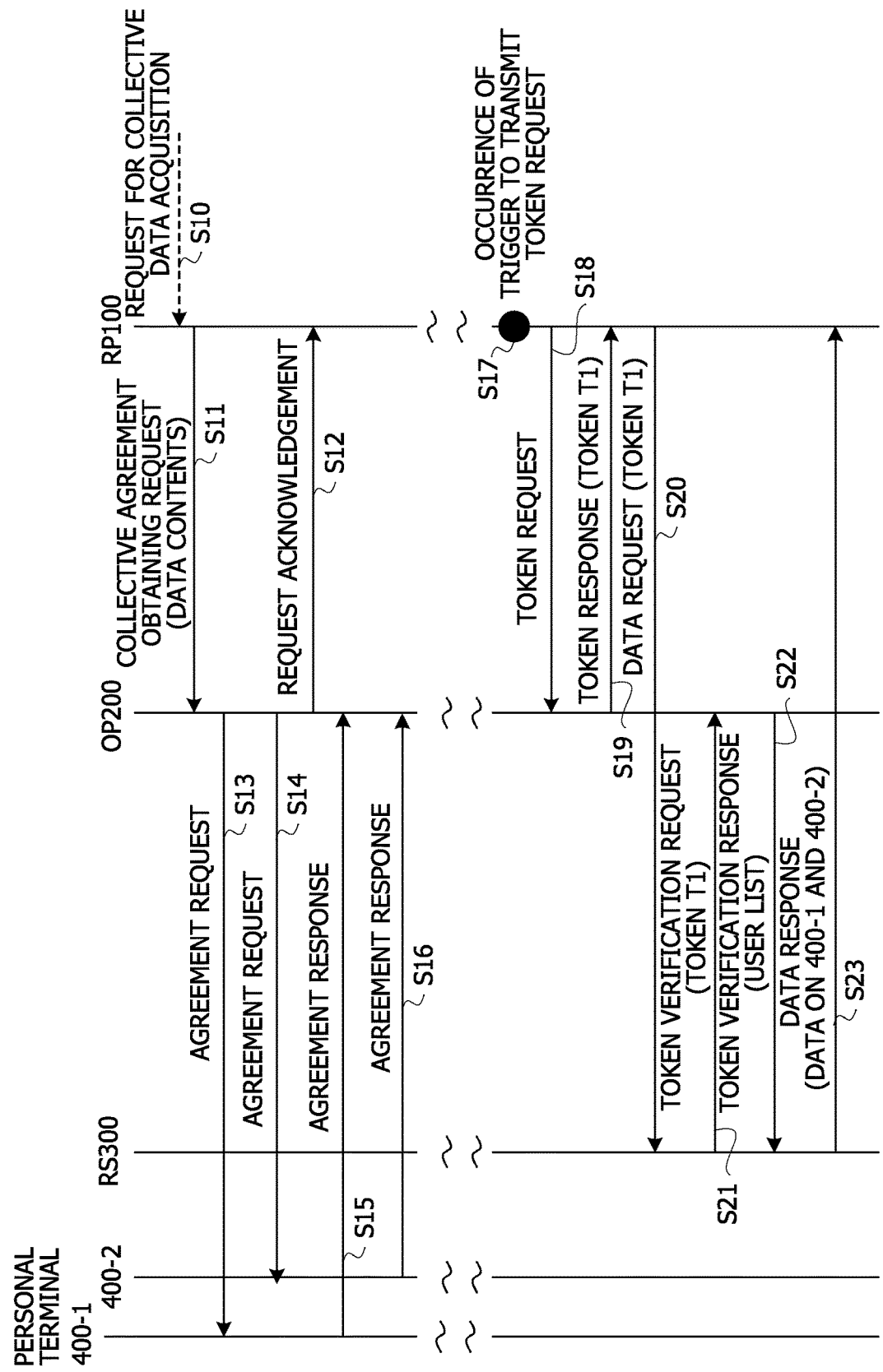
FIG. 5 is a diagram illustrating an example of a sequence of a collective data acquisition process (first day)

FIG. 5 is a diagram illustrating an example of a sequence of the collective data acquisition process (first day).

The RP 100 receives a request for collective data acquisition from, for example, the data user 500 (S10). When the request for collective data acquisition is received, the RP 100 performs the collective data acquisition process (S100).

Figure 6:
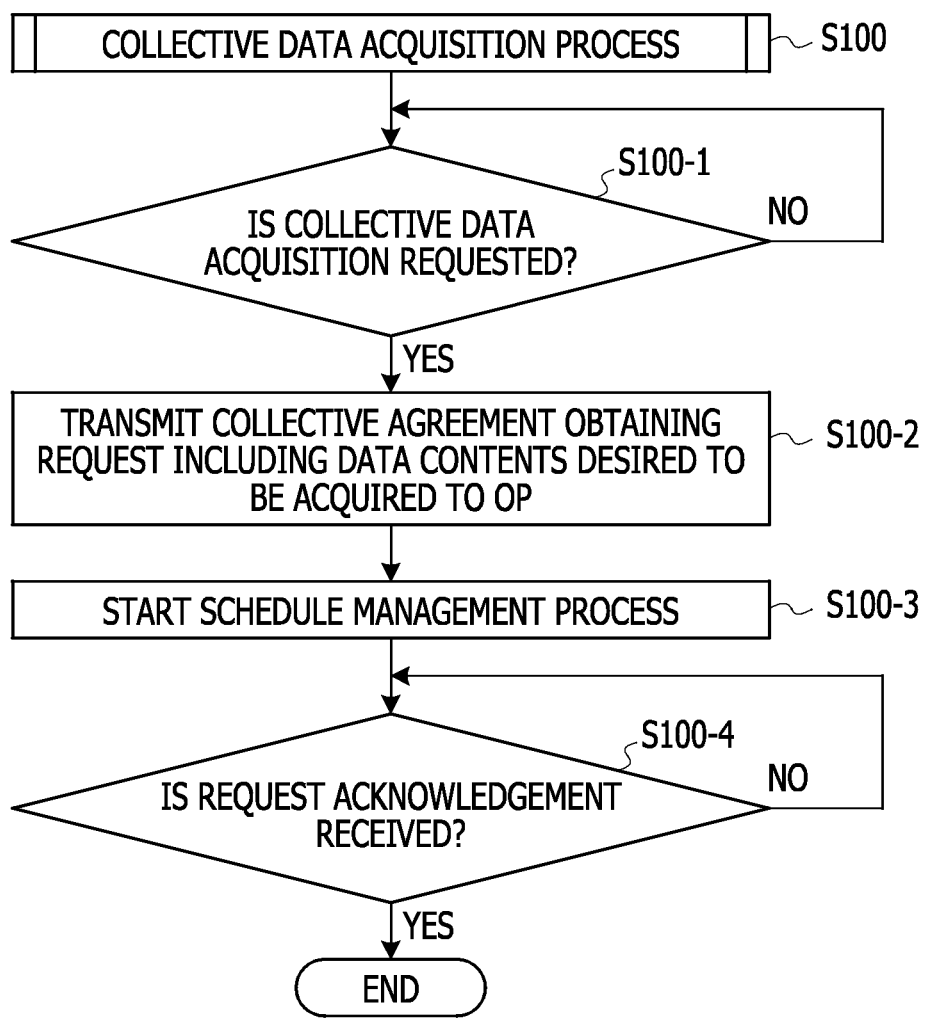
FIG. 6 is a diagram illustrating an example of a processing flowchart of the collective data acquisition process.

FIG. 6 is a diagram illustrating an example of a processing flowchart of the collective data acquisition process S100. The RP 100 waits for reception of a request for collective data acquisition (No in S100-1). When the request for collective data acquisition is received (Yes in S100-1), the RP 100 transmits a collective agreement obtaining request including data contents desired to be acquired to the OP 200 (S100-2). The data contents desired to be acquired are, for example, medical examination data on persons infected with a certain virus.

The RP 100 starts the schedule management process (S100-3). Details of the schedule management process will be described later.

The RP 100 waits for a request acknowledgement (No in S100-4). When the RP 100 receives the request acknowledgement (Yes in S100-4), the RP 100 ends the process.

Figure 7:
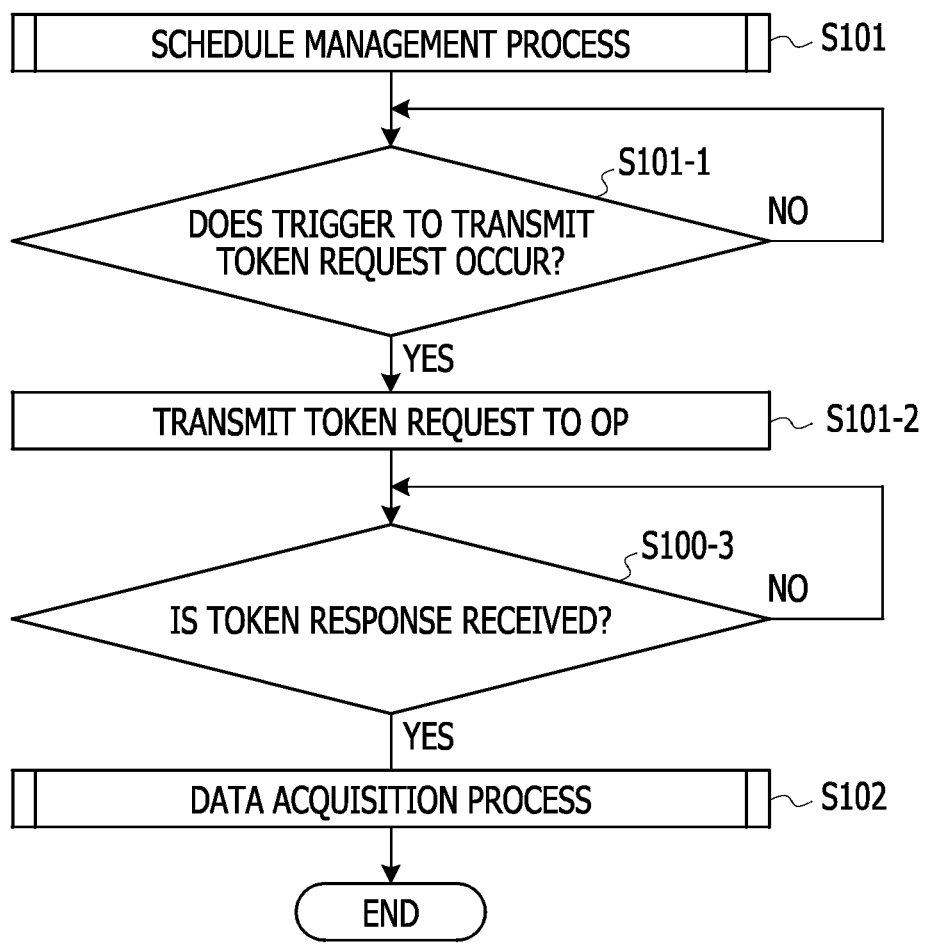
FIG. 7 is a diagram illustrating an example of a processing flowchart of a schedule management process.

FIG. 7 is a diagram illustrating an example of a processing flowchart of the schedule management process S101. The RP 100 waits for occurrence of a trigger to transmit a token request (No in S101-1). When the trigger to transmit a token request occurs (Yes in S101-1), the RP 100 transmits the token request to the OP 200 (S101-2).

The trigger to transmit a token request is set to, for example, a predetermined time which comes once every day. For example, in the RP 100, 23:59 is set as the trigger to transmit a token request.

The RP 100 waits for reception of a token response (No in S101-3). When the token response is received (Yes in S101-3), the RP 100 performs a data acquisition process (S102) and ends the process.

Returning to the sequence in FIG. 5, the RP 100 transmits a collective agreement obtaining request to the OP 200 in the collective data acquisition process S100 (S11 and S100-2 in FIG. 6). The data contents included in the collective data acquisition request herein are "medical examination data on virus-infected persons in a period until August 30". The RP 100 starts the schedule management process S101 (S100-3 in FIG. 6) and waits for the trigger to transmit a token request (S101-1 in FIG. 7). In the collective data acquisition process S100, the RP 100 receives the request acknowledgement (S12 and S100-4 in FIG. 6).

When the collective agreement obtaining request is received, the OP 200 executes a collective agreement obtaining request reception process (S200).

Figure 8:
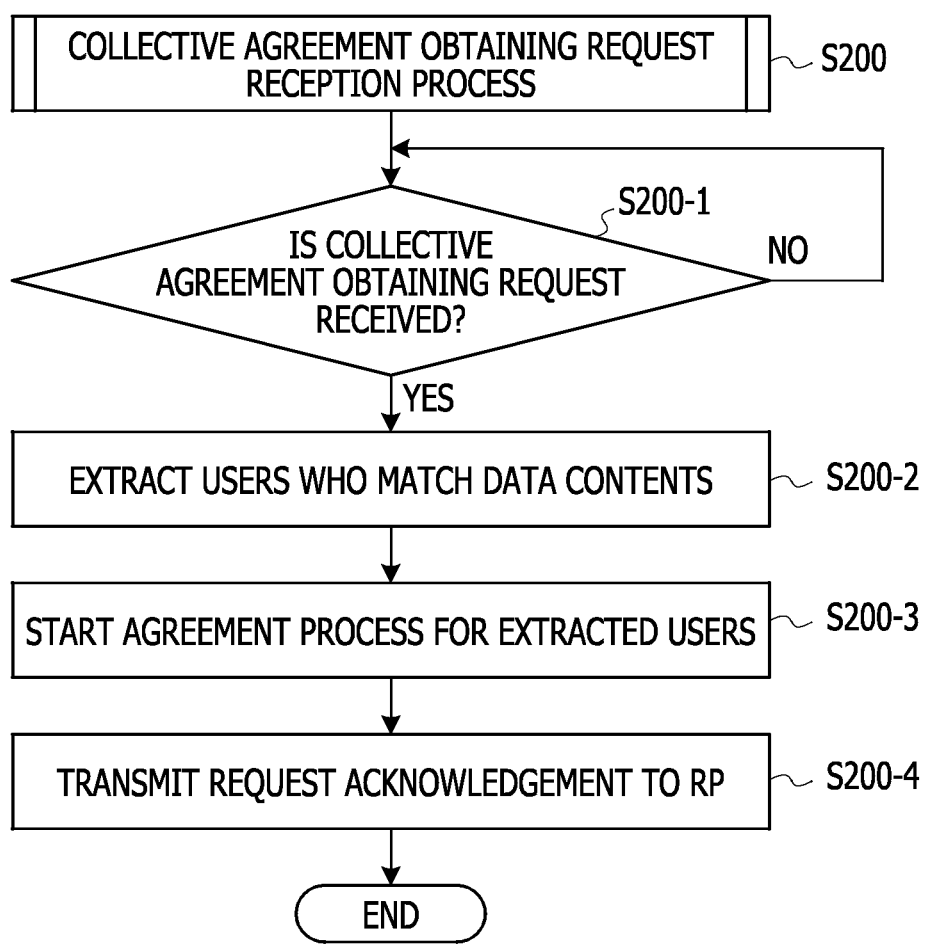
FIG. 8 is a diagram illustrating an example of a processing flowchart of a collective agreement obtaining request reception process.

FIG. 8 is a diagram illustrating an example of a processing flowchart of the collective agreement obtaining request reception process S200. The OP 200 waits for reception of a collective agreement obtaining request (No in S200-1). When the collective agreement obtaining request is received (Yes in S200-1), the OP 200 extracts users (concerned users) who match the data contents (S200-2).

The OP 200 starts an agreement process for the extracted users (S200-3). Details of the agreement process will be described later.

The OP 200 transmits the request acknowledgement to the RP 100 (S200-4) and ends the process.

The user extraction process S200-2 and the agreement process S200-3 are executed at any appropriate time points within the period of collective data acquisition. The OP 200 monitors users who newly match the data contents (afterward) and executes the agreement process for the users who newly match the data contents.

The OP 200 performs the monitoring by, for example, receiving a notification from the RS 300. For example, in the case where the data contents are data on virus-infected persons, every time a user is newly infected, the OP 200 receives a notification of the user from a medical institution (for example, the RS 300) and performs the agreement process for the user.

Alternatively, the OP 200 may perform the monitoring by, for example, acquiring information on data added to or updated in the RS 300. For example, in the case where the data contents are data on virus-infected persons, the OP 200 requests and acquires updated or added information on the virus-infected persons from the medical institution (for example, the RS 300). The OP 200 identifies a user as a new infected person from the acquired information, and performs the agreement process for the concerned user thus identified.

Figure 9:
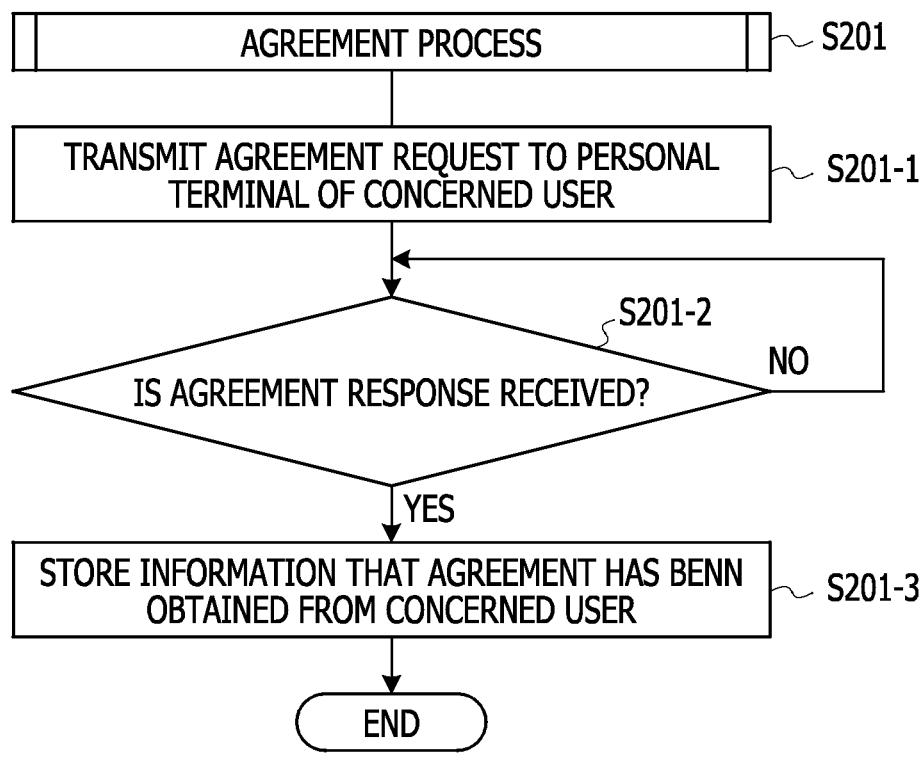
FIG. 9 is a diagram illustrating an example of a processing flowchart of an agreement process.

FIG. 9 is a diagram illustrating an example of a processing flowchart of the agreement process S201. The OP 200 transmits an agreement request to the personal terminal 400 of the concerned user (S201-1).

The OP 200 waits for reception of an agreement response (No in S201-2). When the agreement response is received (Yes in S201-2), the OP 200 stores, if the agreement has been obtained from the concerned user, information that the agreement has been obtained from the concerned user (S201-3) and ends the process.

In the process S200-3 in FIG. 8, the OP 200 executes the agreement process S201 for all the target users.

Returning to the sequence in FIG. 5, in the collective agreement obtaining request reception process S200, the OP 200 extracts the users (of the personal terminals 400-1 and 400-2) who match the data contents (S200-2 in FIG. 8). The OP 200 starts the agreement process S201 for the personal terminals 400-1 and 400-2 (S200-3 in FIG. 8). In the agreement process S201, the OP 200 transmits an agreement request to each of the personal terminals 400-1 and 400-2 (S13, S14, and S201-1 in FIG. 9). The OP 200 transmits a request acknowledgement to the RP 100 (S12 and S200-4 in FIG. 8).

In the agreement process S201, the OP 200 receives the agreement responses from the personal terminals 400-1 and 400-2 (Yes in S201-2 in FIG. 9) and stores the information that the agreement has been obtained from the personal terminals 400-1 and 400-2 (S201-3 in FIG. 9).

In the schedule management process S101, when the trigger to transmit a token request occurs (S17 and Yes in S101-1 in FIG. 7), the RP 100 transmits the token request to the OP 200 (S18 and S101-2 in FIG. 7).

When the token request is received, the OP 200 executes a token request reception process.

Figure 10:
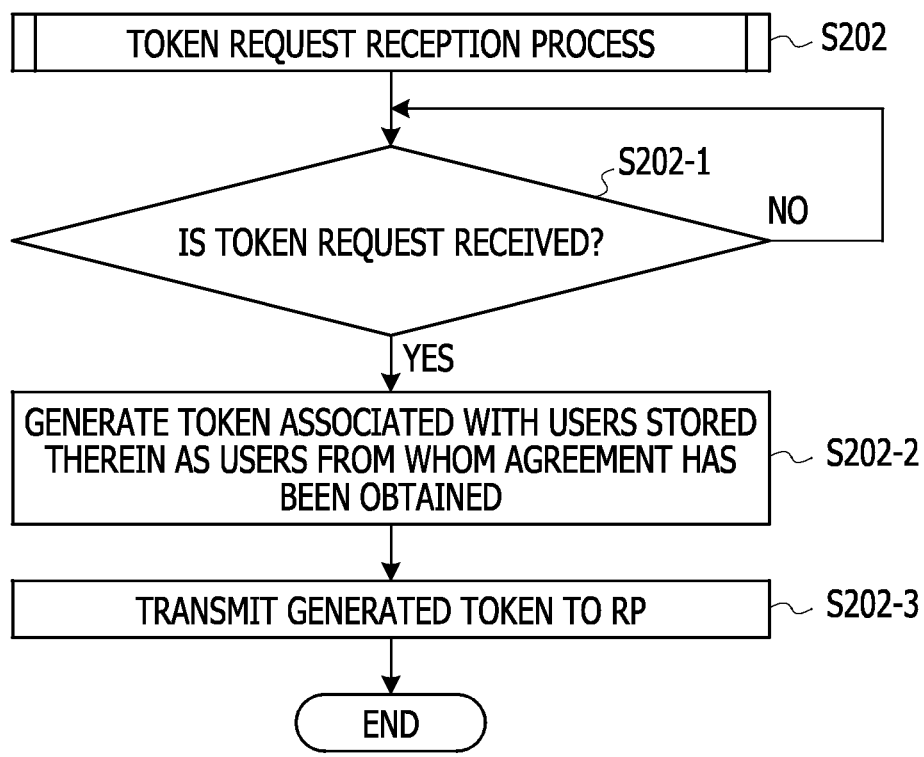
FIG. 10 is a diagram illustrating an example of a processing flowchart of a token request reception process.

FIG. 10 is a diagram illustrating an example of a processing flowchart of the token request reception process S202. The OP 200 waits for reception of a token request (No in S202-1). When the token request is received (Yes in S202-1), the OP 200 generates a token associated with users stored therein as users from whom the agreement has been obtained (agreement users) (S202-2).

The OP 200 transmits the generated token to the RP 100 (S202-3) and ends the process.

Returning to the sequence in FIG. 5, in the token request reception process S202, the OP 200 generates a token T1 associated with the personal terminals 400-1 and 400-2 from which the agreement has been obtained (S202-2 in FIG. 10), and transmits, as a token response, the generated token T1 to the RP 100 (S19 and S202-3 in FIG. 10).

In the schedule management process S101, when the token response is received (Yes in S101-3 in FIG. 7), the RP 100 executes the data acquisition process S102.

Figure 11:
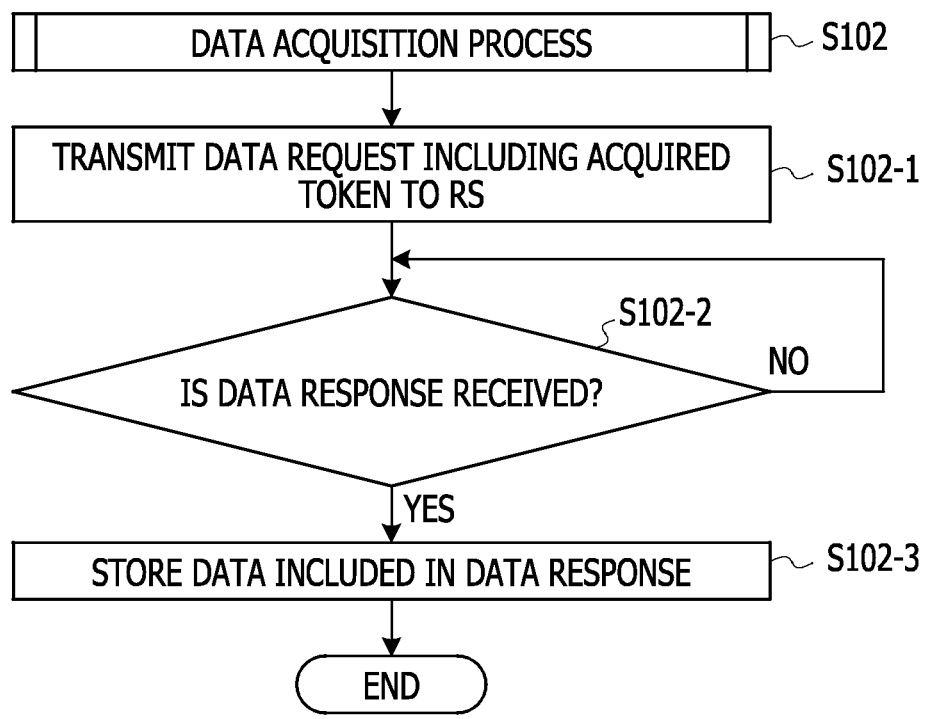
FIG. 11 is a diagram illustrating an example of a processing flowchart of a data acquisition process.

FIG. 11 is a diagram illustrating an example of a processing flowchart of the data acquisition process S102. The RP 100 transmits a data request including the acquired token to the RS 300 (S102-1). The RP 100 waits for reception of a data response (No in S102-2).

When the data response is received (Yes in S102-2), the RP 100 stores the data included in the data response in the internal memory or the like (S102-3) and ends the process.

Returning to the sequence in FIG. 5, in the data acquisition process S102, the OP 200 transmits a data request including the token T1 to the RS 300 (S20 and S102-1 in FIG. 11).

When the data request is received, the RS 300 performs a data request reception process.

Figure 12:
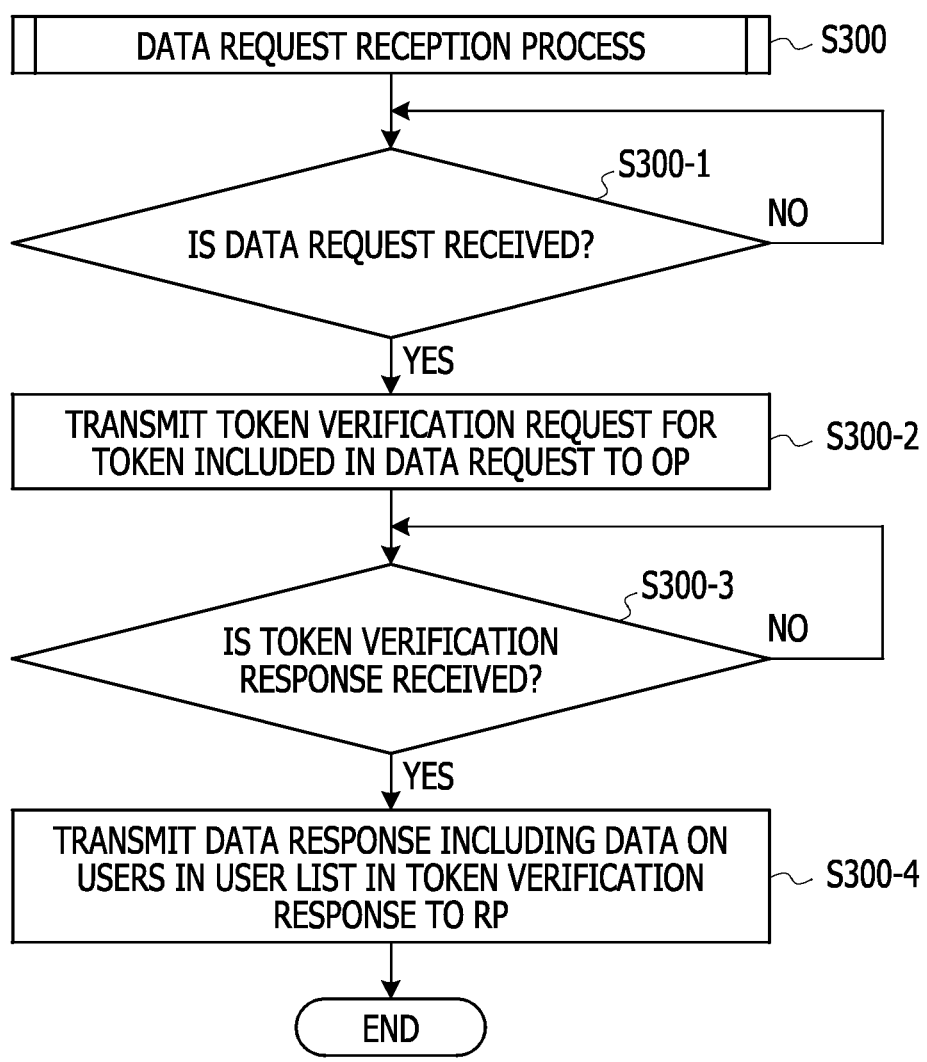
FIG. 12 illustrates an example of a processing flowchart of a data request reception process.

FIG. 12 illustrates an example of a processing flowchart of the data request reception process S300. The RS 300 waits for reception of a data request (No in S300-1). When the data request is received (Yes in S300-1), the RS 300 transmits a token verification request for the token included in the data request to the OP 200 (S300-2).

The RS 300 waits for a token verification response (No in S300-3). When the token verification response is received (Yes in S300-3), the RS 300 extracts the data on the users in the user list included in the token verification response, transmits a data response including the extracted data to the RP 100 (S300-4), and ends the process.

Returning to the sequence in FIG. 5, in the data request reception process S300, the RS 300 transmits a data verification request including the token T1 to the OP 200 (S21 and S300-2 in FIG. 12).

When the token verification request is received, the OP 200 performs a token verification request reception process.

Figure 13:
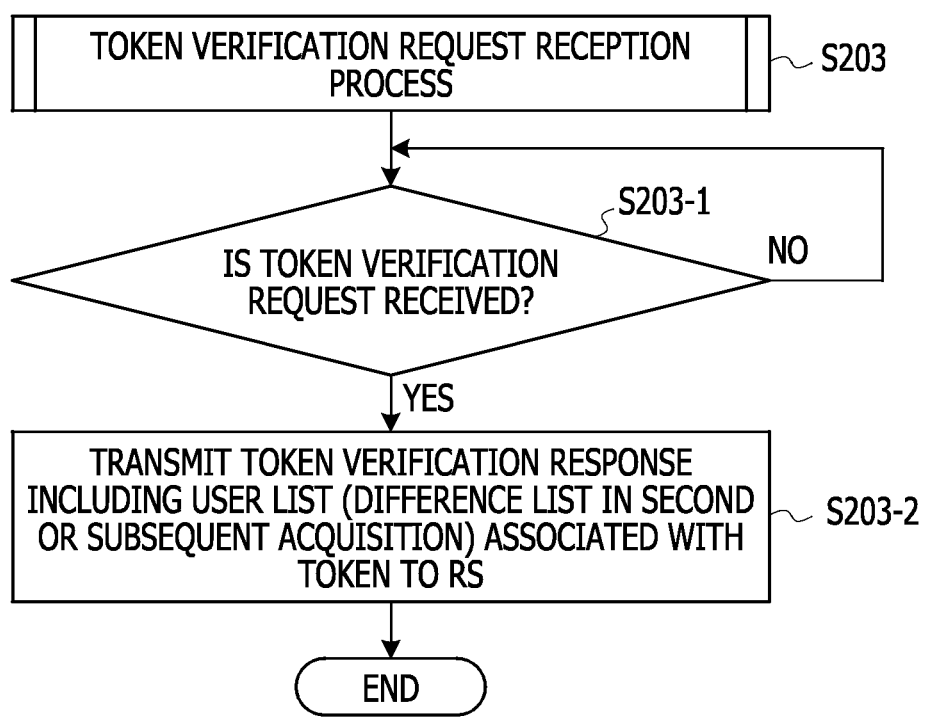
FIG. 13 is a diagram illustrating an example of a processing flowchart of a token verification request reception process.

FIG. 13 is a diagram illustrating an example of a processing flowchart of the token verification request reception process S203. The OP 200 waits for reception of a token verification request (No in S203-1). When the token verification request is received (Yes in S203-1), the OP 200 transmits a token verification response (token permission) including the user list associated with the token to the RS 300 (S203-2), and ends the process.

The user list at the second or subsequent acquisition is a difference list. Use of the difference list avoids redundant transmission of the data on the same user.

Before the transmission of the token verification response, the OP 200 may verify whether or not the token is valid (whether or not the token is one issued by the OP 200). In this case, when the token is invalid, the OP 200 may be stopped from transmitting the token verification response or may transmit a token verification response including information that the token is invalid.

Returning to the sequence in FIG. 5, in the token verification request reception process S203, the OP 200 includes the personal terminals 400-1 and 400-2 associated with the token T1 in the user list, and transmits the token verification response including the user list to the RS 300 (S22 and S203-2 in FIG. 13).

In the data request reception process S300, the RS 300 receives the token verification response (Yes in S300-3 in FIG. 12), and transmits a data response containing data (for example, medical examination data) on the users of the personal terminals 400-1 and 400-2 in the user list to the RP 100 (S23 and S300-4 in FIG. 12).

In the data acquisition process S102, the RP 100 receives the data response (Yes in S102-2 in FIG. 11), and stores, in the internal memory, the medical examination data on the users of the personal terminals 400-1 and 400-2 included in the data response.

FIGS. 14A and 14B are diagrams illustrating examples of internal tables included in the OP 200. FIG. 14A is a diagram illustrating an example of an agreement state table in which agreement states of users are stored. "User" indicates a user from whom an agreement is to be obtained. "CD" indicates a data user who requests data acquisition. "Agreement state" indicates the state of the agreement and is expressed by OK, NO, RESPONSE WAITING, or the like. "Date and time of obtaining" indicate a date and time when the agreement OK or NO was obtained.

When the agreement was obtained in the agreement process S201, the OP 200 stores the date and time when the agreement was obtained in the "date and time of obtaining" field and stores OK in the "agreement state" field. In FIG. 14A, for example, users 400-1, 400-2, and 400-3 are examples of users from whom the agreement has been obtained.

When the agreement was not obtained in the agreement process S201, the OP 200 stores the date and time when the agreement was not obtained in the "date and time of obtaining" field and stores NO in the "agreement state" field. In FIG. 14A, for example, a user 400-n is an example of a user from whom the agreement was not obtained.

In the agreement process S201, the OP 200 stores RESPONSE WAITING in the "agreement state" field for a user from whom the agreement has been requested but the agreement response has not been received yet. In FIG. 14A, for example, a user 400-4 is an example of a user from whom the agreement is waited for.

FIG. 14B is a diagram illustrating an example of a token table that stores generated tokens. "CD" indicates a data user who requests data acquisition. "RP" indicates an identifier of the RP 100 that transmitted a collective agreement obtaining request. Although only one RP 100 exists in FIG. 1, multiple RPs 100 may exist in operation.

"Request" indicates an identifier of a request, and is, for example, a number issued for each of collective agreement obtaining requests. "Token" indicates an identifier of a token. "Generation time" indicates a date and time when the token was generated. "User list" indicates a list of users associated with a token. "Difference list" is a list of users in a difference between the previous user list and the current user list. The user in the difference (non-permitting user) is a user who is not listed in the user list or the difference list included in the previously transmitted token verification response and who has not permitted disclosure of his/her data.

The OP 200 generates a token in response to reception of a token request. At this time, the OP 200 stores "CD", "RP", "request", "token", and "generation time". The OP 200 extracts users from whom the agreement has been obtained from the agreement state table and stores the extracted users in the "user list". If there is a difference in the user list, the OP 200 stores the difference in the difference list.

In FIG. 14B, for example, a token T1 is a token associated with the users of the personal terminals 400-1 and 400-2. In FIG. 14B, for example, a token T2 is a token associated with the users of the personal terminals 400-1, 400-2, and 400-3. The difference list indicates the user of the personal terminal 400-3 who is a difference from the users in the user list of the token T1.

[Second or Subsequent Day]

Figure 15:
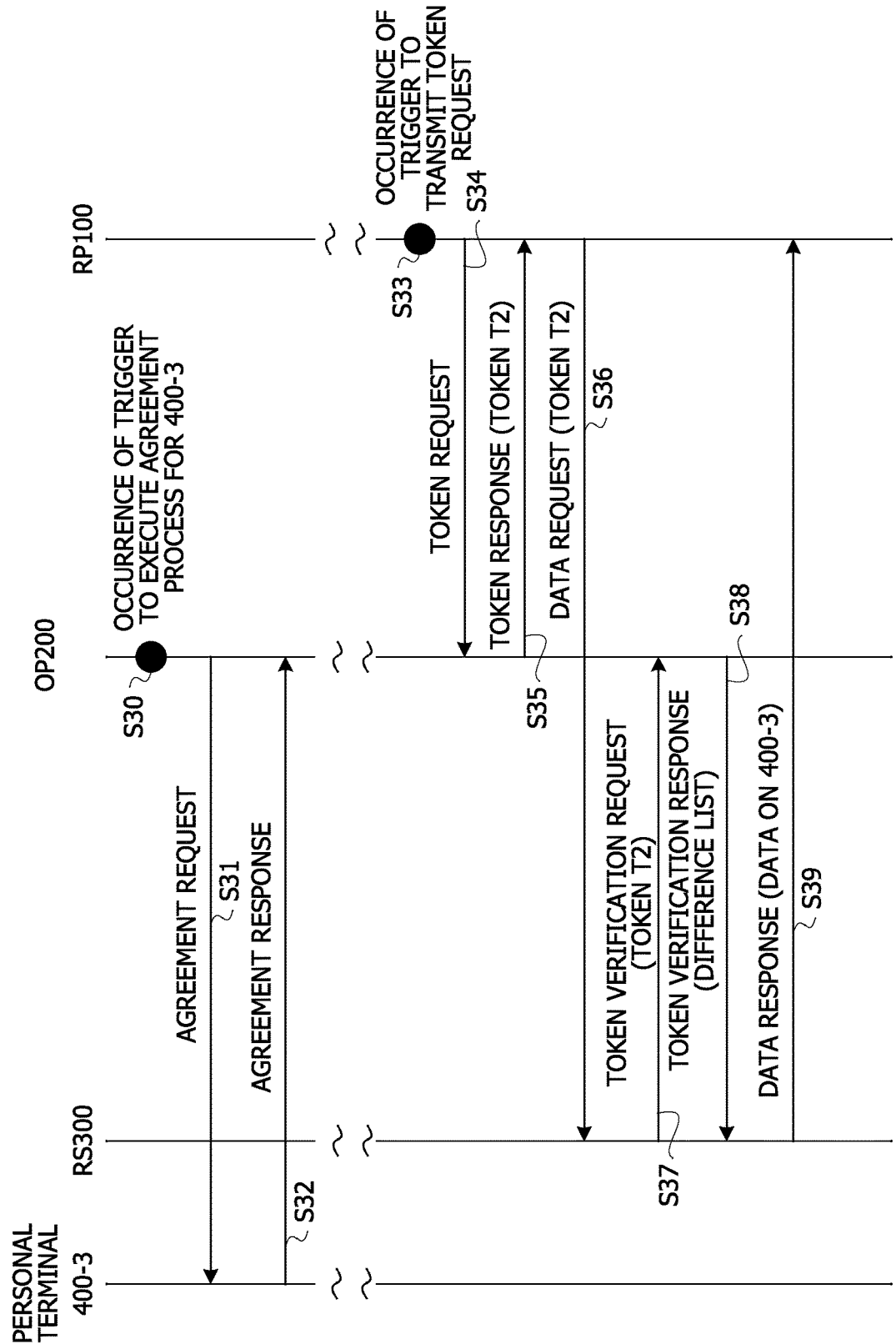
FIG. 15 is a diagram illustrating an example of a sequence of the collective data acquisition process (on the second or subsequent day)

FIG. 15 is a diagram illustrating an example of a sequence of the collective data acquisition process (on the second or subsequent day). A trigger to execute the agreement process S201 for the personal terminal 400-3 occurs (S30).

The OP 200 executes the agreement process S201 for the personal terminal 400-3. The OP 200 transmits an agreement request to the personal terminal 400-3 (S31 and S201-1 in FIG. 9), receives an agreement response from the personal terminal 400-3 (S32 and Yes in S201-2 in FIG. 9), and stores information that the agreement has been obtained from the personal terminal 400-3 (201-3 in FIG. 9).

In the schedule management process S101, when the trigger to transmit a token request occurs (S33 and Yes in S101-1 in FIG. 7), the RP 100 transmits the token request to the OP 200 (S34 and S101-2 in FIG. 7).

When the token request is received, the OP 200 performs the token request reception process. In the token request reception process S202, the OP 200 generates a token T2 associated with the personal terminals 400-1, 400-2, and 400-3 from which the agreement has been obtained (S202-2 in FIG. 10), and transmits the generated token T2 to the RP 100 as a token response (S35 and S202-3 in FIG. 10).

In the schedule management process S101, when the token response is received (Yes in S101-3 in FIG. 7), the RP 100 executes the data acquisition process S102. In the data acquisition process S102, the OP 200 transmits a data request including the token T2 to the RS 300 (S36 and S102-1 in FIG. 11).

When the data request is received, the RS 300 performs the data request reception process. In the data request reception process S300, the RS 300 transmits a data verification request including the token T2 to the OP 200 (S37 and S300-2 in FIG. 12).

When the token verification request is received, the OP 200 performs the token verification request reception process. In the token verification request reception process S203, the OP 200 includes the personal terminal 400-3 associated with the token T2 in the difference list and transmits the token verification response including the difference list to the RS 300 (S38 and S203-2 in FIG. 13).

In the data request reception process S300, the RS 300 receives the token verification response (Yes in S300-4 in FIG. 12) and transmits, to the RP 100, a data response including the data on the user of the personal terminal 400-3 in the difference list (S39 and S300-2 in FIG. 12).

In data acquisition process S102, the RP 100 receives the data response (Yes in S102-2 in FIG. 11), and stores the medical examination data on the user of the personal terminal 400-3 included in the data response in the internal memory. Thus, the RP 100 stores the data on the users of the personal terminals 400-1 to 400-3.

Thereafter, the sequence on the second or subsequent day is repeated until August 30, which is specified to designate a period in the data contents for the collective data acquisition.

In the first embodiment, the OP 200 performs the agreement process for users at any appropriate time points during the collective data acquisition. When the RP 100 performs schedule management and requests a token from the OP 200, the OP 200 transmits a token associated with users from whom the agreement has been obtained by that time. This enables the RP 100 to regularly acquire requested data without waiting until the agreement of all the users is obtained and without transmitting an agreement obtaining request for each individual user to the OP 200.

Second Embodiment

Next, a second embodiment will be described. In the second embodiment, the RP 100 transmits a token request in response to a collection request from the OP 200. For example, one of the triggers to transmit a token request is reception of a collection request transmitted from the OP 200.

FIG. 16 is a diagram illustrating an example of a sequence of a data acquisition process in response to a collection request.

In the OP 200, a trigger to transmit a collection request occurs (S50). The trigger to transmit a collection request is, for example, a condition where the number of data target users reaches a predetermined number or more. This intends to request the RP 100 to acquire data divided to some extent because the amount of data to be acquired may become too large if the number of target users significantly increases. In the example of "medical examination data on virus-infected persons in a period until August 30", the case where the number of virus-infected persons explosively increases applies to the above example.

The trigger to transmit a collection request is, for example, a condition where the number of users from whom the agreement has been obtained reaches a predetermined number or more. This intends to urge the RP 100 to acquire data without waiting for the regular time (23:59 in this case) because the amount of data to be acquired is appropriate when the number of users from whom the agreement has been obtained reaches the predetermined number or more. The RP 100 is enabled to acquire a certain amount of data without waiting for the regular time.

When the trigger to transmit a collection request occurs (S50), the OP 200 transmits the collection request to the RP 100 (S51).

When the collection request is received, the RP 100 determines that the trigger to transmit a token request occurs in the schedule management process S101 (Yes in S101-1 in FIG. 7), and transmits the token request to the OP 200 (S53 and S101 in FIG. 7).

Thereafter, in the processing at the processes S54 to S58, the same processing as that at the processes S19 to S23 in FIG. 5 is performed in the case of the first day (first acquisition), and the same processing as that at the processes S35 to S39 in FIG. 15 is performed in the case of the second or subsequent day (second or subsequent acquisition).

In the second embodiment, the OP 200 is enabled to take initiative to request the RP 100 to transmit a token request. This makes it possible to handle cases where an immediate data acquisition is desired (for example, where otherwise the amount of data may be enormous) in addition to periodical token requests.

Other Embodiments

The data acquisition process may be implemented using the CIBA protocol. In this case, communication between the RP 100 and the OP 200 in the communication system 1 conforms to the CIBA protocol.

The collective agreement obtaining request in FIG. 5 may be implemented by using signed authentication request. As parameters of a message in this case, there may be added a parameter indicating which of collective data acquisition and individual data acquisition is requested and a parameter indicating data contents. Thus, the communication system 1 is enabled to perform both individual data acquisition and collective data acquisition.

The request acknowledgement may be made by using successful authentication request acknowledgement.

The token request may be made by using a token request using CIBA grant type. As parameters of a massage in this case, there may be added a parameter indicating which request the message is associated with (which collective data acquisition request or which individual data acquisition request the message is associated with).

The token response may be made by using successful token response. A message in this case may include the generated token.

A collection request message in the second embodiment may use registration and discovery metadata as a message indicating support/non-support states of the RP 100. This indicates sequences which the RP 100 supports. The sequences include, for example, POLL, PING, PUSH, and so on.

For example, POLL is a sequence in which the RP 100 inquires of the OP 200 whether or not issuance of a token is possible (equivalent to a token request). In response to the inquiry, the OP 200 performs a process such as responding that a token is not yet ready to be transmitted or transmitting a token because it is possible to generate the token. The sequence of the example in the first embodiment is equivalent to POLL in CIBA.

PING is, for example, a sequence in which the OP 200 transmits to the RP 100 information that issuance of a token is possible (equivalent to the collection request in the second embodiment). The sequence of the example in the second embodiment is equivalent to PING in CIBA.

PUSH is, for example, a sequence in which the OP 200 autonomously transmits a token to the RP 100. For example, in the second embodiment, the OP 200 is able to implement PUSH in CIBA by transmitting an autonomously generated token without transmitting a collection request.

The RP 100 transmits registration and discovery metadata including information about which sequences are supported by the RP 100 to the OP 200 in advance (for example, at the time when the communication system 1 is constructed or at the time when the RP 100 is installed). The case where the supported sequence is only POP means that the RP 100 does not support the second embodiment, and the case where the supported sequences are POP and PUSH means that the RP 100 also supports the second embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a procedure, the procedure comprising:
   executing the procedure by a data utilization server including:
   transmitting request information concerning user data of a plurality of users to be collectively acquired, to an agreement server, the request information being transmitted to a plurality of terminals of the plurality of users who are determined to fall under the request information whereby the plurality of users are respectively requested to approve an agreement to allow the user data of the plurality of users to be collectively disclosed to the data utilization server, the user data to be acquired from a data management server that manages the user data on the plurality of users, by using a token that is issued by the agreement server and that permits collective disclosure of the user data on the plurality of users from whom the agreement has been obtained;
   transmitting a first token request to the agreement server, based on occurrence of a transmission timing scheduled for the first token request, to thereby trigger acquiring, from the data management server, of respective user data of users from whom the agreement to allow disclosure of the respective user data has been obtained among the plurality of users who fall under the request information; and
   acquiring, from the data management server, user data that is not yet acquired among the user data on the plurality of users from whom the agreement has been obtained, by causing the user data that is not yet acquired using a second token transmitted at the transmission timing scheduled and information indicating a difference between the users from whom the agreement has been obtained and users associated with the user data that is not yet acquired.

2. The non-transitory computer-readable recording medium according to claim 1, wherein the transmission timing includes being set to a predetermined time.

3. The non-transitory computer-readable recording medium according to claim 1, wherein at a time when the agreement server requests to transmit the first token request, the first token request is transmitted to the agreement server even though the time is not the transmission timing.

4. The non-transitory computer-readable recording medium according to claim 1, wherein the request information includes a condition of a data content that the data utilization server desires to acquire.

5. The non-transitory computer-readable recording medium according to claim 4, wherein the condition of the data content includes a temporal condition.

6. A non-transitory computer-readable recording medium storing a program that causes a computer to execute a procedure, the procedure comprising:
   executing the procedure by an agreement server including:
   receiving request information concerning user data of a plurality of users to be collectively acquired by a data utilization server, the request information being associated with a plurality of terminals of the plurality of users who are determined to fall under the request information and the data utilization server acquiring the user data from a data management server that manages the user data on the plurality of users, by using a token that is associated with the plurality of users from whom an agreement has been obtained, and that is issued by an agreement server that requests the plurality of users to approve an agreement to allow the user data of the plurality of users to be collectively disclosed to the data utilization server, the request information being received from the data utilization server;
   extracting user data of concerned users who fall under the request information and requesting the agreement from the concerned users based on the request information being received;
   based on occurrence of a timing scheduled for a token request for requesting to issue a token is received from the data utilization server, issuing a respective token associated with agreement users from whom the agreement has been obtained and transmitting the respective token to the data utilization server; and
   based on a request by the data management server to verify the respective token, permitting the data management server to disclose user data on a non-permitting user who has not permitted disclosure provided the non-permitting user is among the agreement users based on the token request at the timing scheduled and information indicating a difference between the agreement users from whom the agreement has been obtained and users associated with the user data that is not yet acquired.

7. The non-transitory computer-readable recording medium according to claim 6, wherein the procedure requests the agreement from a new concerned user who did not fall under the request information when the extracting was performed but falls under the request information afterwards.

8. The non-transitory computer-readable recording medium according to claim 7, the procedure further comprising:
   requesting the data utilization server to transmit the token request when a predetermined condition is satisfied.

9. The non-transitory computer-readable recording medium according to claim 8, wherein the predetermined condition includes a condition where a number of new concerned users reaches a threshold or more.

10. The non-transitory computer-readable recording medium according to claim 8, wherein the predetermined condition includes a condition where a number of non-permitting users reaches a second threshold or more.

11. A communication method comprising:

transmitting request information concerning user data of a plurality of users to be collectively acquired, to an agreement server, the request information being transmitted to a plurality of terminals of a plurality of users the plurality of users who are determined to fall under the request information whereby the plurality of users are respectively requested to approve an agreement to disclose the user data to a data utilization server, the user data to be acquired from a data management server by using a token that is issued by the agreement server and that is associated with the plurality of users from whom the agreement has been obtained, the data management server managing the user data on the plurality of users, by the data utilization server;

receiving the request information, extracting concerned users who fall under the request information, and requesting the agreement from the concerned users, by the agreement server;

receiving a token request, by the agreement server, from the data utilization server based on occurrence of a transmission timing scheduled for the token request, to thereby trigger acquiring, from the data management server, of agreement users from whom the agreement has been obtained and transmitting the token to the data utilization server, by the agreement server;

receiving the token and transmitting, to the data management server, a data request that includes the token and requests to disclose the user data on the users associated with the token, by the data utilization server;

receiving the data request and transmitting a token verification request that is a request to verify the token to the agreement server, by the data management server;

receiving the token verification request and transmitting, to the data management server, a token permission for permitting the data management server to disclose the user data on a non-permitting user who has not yet permitted disclosure before among the agreement users associated with the token, by the agreement server; and receiving the token permission and transmitting the user data on the non-permitting user to the data utilization server, by the data management server, based on the receiving of the token request at the transmission timing scheduled and information indicating a difference between the agreement users from whom the agreement has been obtained and users associated with the user data that is not yet acquired.

12. The communication method according to claim 11, wherein a message transmitted and received between the data utilization server and the agreement server conforms to a client initiated backchannel authentication (CIBA) protocol.

* * * * *